(12) United States Patent
Seligmann et al.

(10) Patent No.: US 7,162,256 B2
(45) Date of Patent: Jan. 9, 2007

(54) PRESENCE-BASED TELECOMMUNICATIONS SYSTEM

(75) Inventors: Doree Duncan Seligmann, New York, NY (US); Michael J. Sammon, Watchung, NJ (US); Lynne Shapiro Brotman, Westfield, NJ (US); Anjum Khan, Ilford (GB); Reinhard Peter Klemm, Basking Ridge, NJ (US); Ajita John, Middletown, NJ (US); David Gray Boyer, Oceanport, NJ (US)

(73) Assignee: Avaya Technology Corp., Basking Ridge, NJ (US)

(*) Notice: Subject to any disclaimer, the term of this patent is extended or adjusted under 35 U.S.C. 154(b) by 319 days.

(21) Appl. No.: 10/742,243

(22) Filed: Dec. 19, 2003

(65) Prior Publication Data

US 2005/0070312 A1 Mar. 31, 2005

Related U.S. Application Data

(60) Provisional application No. 60/507,153, filed on Sep. 30, 2003.

(51) Int. Cl.
*H04Q 7/20* (2006.01)

(52) U.S. Cl. .............. 455/456.6; 455/414.2; 455/456.1

(58) Field of Classification Search ............ 455/456.6, 455/456.1, 422, 440, 456.3, 414.2; 379/218.01, 379/218.02, 201.06, 201.08
See application file for complete search history.

(56) References Cited

U.S. PATENT DOCUMENTS 5,924,041 A * 7/1999 Alperovich et al. ..... 455/456.1

| | | | |
|---|---|---|---|
| 6,088,435 A | 7/2000 | Barber et al. | |
| 2003/0065788 A1* | 4/2003 | Salomaki | 709/227 |
| 2004/0248597 A1* | 12/2004 | Mathis | 455/466 |
| 2005/0102389 A1* | 5/2005 | Liscano et al. | 709/224 |

FOREIGN PATENT DOCUMENTS

| | | |
|---|---|---|
| DE | 10142671 A1 | 3/2003 |
| EP | 0795991 A1 | 9/1997 |
| WO | WO 01/33429 A2 | 5/2001 |
| WO | WO 02/25986 A1 | 3/2002 |

* cited by examiner

*Primary Examiner*—Lester Kincaid
*Assistant Examiner*—Sayed T. Zewari
(74) *Attorney, Agent, or Firm*—DeMont & Breyer, LLC

(57) ABSTRACT

A method and apparatus for enabling a user of a telecommunications terminal to specify desired characteristics for the recipient of a call in lieu of a contact identifier are disclosed. The illustrative embodiment enables a user to specify one or more of the following criteria for a recipient: (i) a role requirement that specifies a role (e.g., a nurse, a doctor, etc.); (ii) a capability requirement that specifies one or more capabilities (e.g., able to speak Spanish, etc.); (iii) a location requirement (e.g., on the third floor of Building A, etc.); and (iv) a cardinality descriptor for the number of recipients (e.g., one recipient, at least three recipients, etc.). The illustrative embodiment also employs availability data (e.g., a schedule, etc.) and rules to determine whether a particular person is available to receive a call.

18 Claims, 4 Drawing Sheets

PRESENCE-BASED TELECOMMUNICATIONS SYSTEM

REFERENCE TO RELATED APPLICATIONS

This application claims the benefit of U.S. Provisional Patent Application 60/507,153, filed on 30 Sep. 2003, entitled "Presence-Based Telecommunications System With Hierarchical Rules," which is also incorporated by reference.

FIELD OF THE INVENTION

The present invention relates to telecommunications in general, and, more particularly, to a technique for intelligently determining who the recipients of a call should be.

BACKGROUND OF THE INVENTION

The user of a telecommunications terminal (e.g., a telephone, a pager, a personal digital assistant [PDA], etc.) typically makes a call (e.g., a telephone call, a page,.a text-based instant message, an email message, etc.) by specifying one or more contact identifiers (e.g., telephone numbers, email addresses, etc.) that correspond to the person(s) to which the call is be directed. Telecommunications terminals typically employ one or more input means (e.g., digit keypad, microphone, alphanumeric keyboard, pen-based input, etc.) through which the user specifies the desired contact identifier or shortcut.

SUMMARY OF THE INVENTION

The present invention enables a user of a telecommunications terminal to initiate a call to a recipient without some of the costs, disadvantages, and limitations of techniques in the prior art. For example, the illustrative embodiment enables a call to be directed, not merely based on a contact identifier associated with a person, but based on one or more defining characteristics for the recipient(s) of the call. In other words, the illustrative embodiment of the present invention enables a user of a telecommunications terminal to specify that a call is to be directed to a recipient who satisfies one or more of the following criteria:

(i) a role requirement that specifies a role (e.g., a nurse, a doctor, etc.),
(ii) a capability requirement that specifies one or more capabilities (e.g., able to administer Cardio-Pulmonary Resuccessitation [CPR], able to speak Spanish, etc.), and
(iii) a location requirement (e.g., in Building A, on the third floor of Building A, within 100 feet of Room 325 in Building A, closest to Room 325 in Building A, etc.).

The illustrative embodiment also enables a user to specify a cardinality descriptor, which indicates how many recipients there should be for the call.

For example, a user of a telecommunications terminal might wish to contact whichever nurse is closest to Room 325 in order to instruct that nurse to check up on Mr. Johnson, a patient in Room 325. As another example, a user might wish to call anybody who knows CPR and is within 50 feet of Room 325 to inform them that Mr. Johnson has stopped breathing. As a third example, a user might wish to call any two security guards and a medical professional (e.g., a doctor, nurse, physician's assistant, etc.) currently on the third floor to instruct them to pacify Mr. Johnson, who is acting violently (i.e., two security guards to restrain Mr. Johnson and the medical professional to give him an appropriate injection.)

The illustrative embodiment of the present invention stores for each potential recipient of a call: an associated role, a set of one or more capabilities, the user's current location, and an availability datum (e.g., an on-duty schedule, etc.) that, in conjunction with one or more rules, indicates whether a particular user is available to receive a call. For example, a rule might specify that a nurse is unavailable to receive a call when she is in the rest room, unless the capability requirement associated with the call is "knows CPR."

For the purposes of this specification, a "call" is defined to encompass all types of communications including a traditional voice telephone call, a videophone call, an email message, a text-based instant message, etc.

For the purposes of this specification, a "contact identifier" is defined as a string of one or more symbols that uniquely identifies a particular destination for a call (e.g., a telephone number, an email address, an Internet Protocol address etc.).

For the purposes of this specification, the term "calendrical time" is defined as indicative of one or more of the following:

(i) a time (e.g., 16:23:58, etc.),
(ii) one or more temporal designations (e.g., Tuesday, Novemeber, etc.),
(iii) one or more events (e.g., Thanksgiving, John's birthday, etc.), and
(iv) a time span (e.g., 8:00–9:00, etc.).

For the purposes of this specification, a "role requirement" is defined as a logical expression with respect to one or more roles (e.g., $R_1$, not $R_1$, $R_1$ or $R_2$, $R_1$ and $R_2$, $R_1$ and ($R_2$ or $R_3$), etc., where $R_1$, $R_2$, and $R_3$ are roles.) A user role R matches a role requirement $R_i$ either if (i) $R=R_i$, or (ii) R is a child of $R_i$ in a hierarchy of roles.

For the purposes of this specification, a "capability requirement" is defined as a logical expression with respect to one or more capabilities (e.g., $C_1$, not $C_1$, $C_1$ or $C_2$, $C_1$ and $C_2$, $C_1$ and ($C_2$ or $C_3$), etc., where $C_1$, $C_2$, and $C_3$ are capabilities.)

For the purposes of this specification, a "location requirement" is defined as a relation between the location of a user and a particular target (e.g., a point, an area, etc.). Examples of location requirements include: inside Room 325, outside Room 325, within 30 feet of Room 310, on the third floor, outside a radius of 30 feet from Room 325, closest to Room 325, and furthest from Room 325.

For the purposes of this specification, a "cardinality descriptor" is defined as an arithmetic relation comprising at least one numeric value and one or more of the following operators: equals, not equals, less than, and greater than.

The illustrative embodiment comprises: a memory for associating each of a plurality of users with one or more roles and a current location; and a processor for: (i) receiving a transmission request that specifies a role requirement and a location requirement, and (ii) determining to which of said users to transmit based on said role requirement, said location requirement, and the contents of said memory.

DETAILED DESCRIPTION

Figure 1:
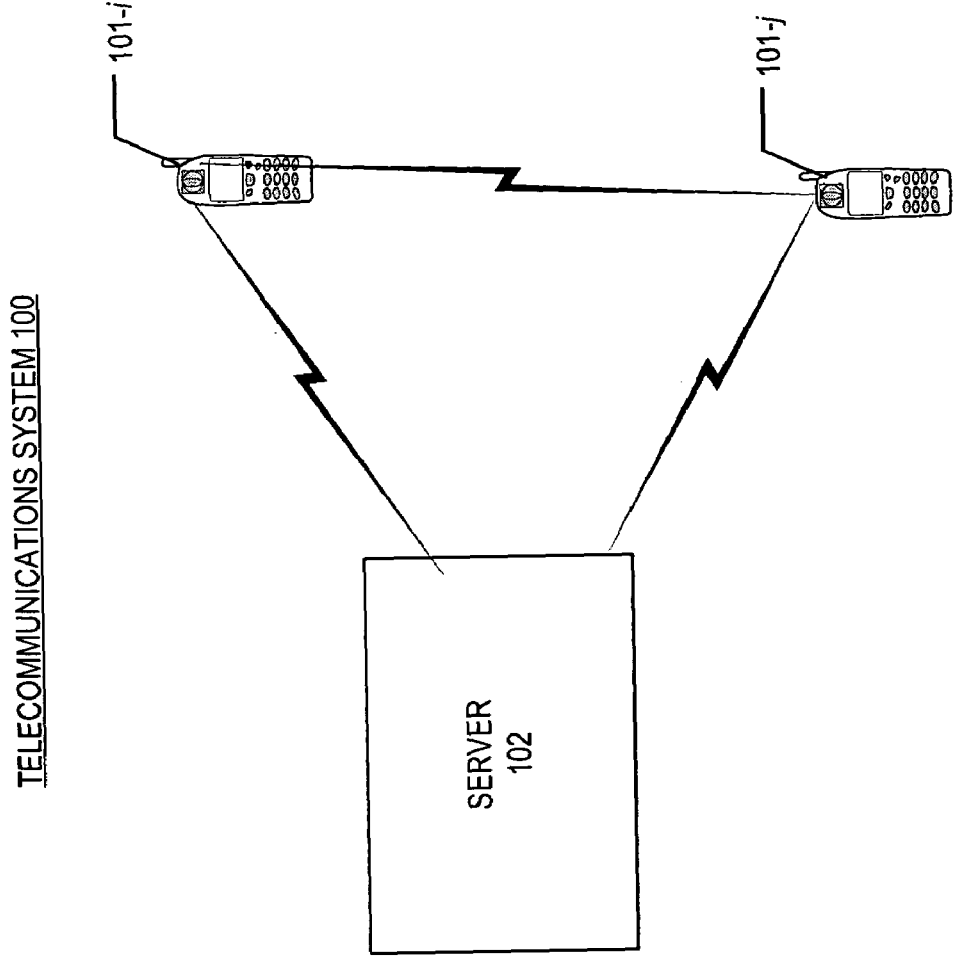
FIG. 1 depicts a portion of a telecommunications system in accordance with the illustrative embodiment of the present invention.

FIG. 1 depicts a portion of telecommunications system 100 in accordance with the illustrative embodiment of the present invention. As shown in FIG. 1, telecommunications system 100 comprises telecommunications terminal 101-$i$ and 101-$j$ and server 102. Telecommunications terminals 101-$i$ and 101-$j$ communicate with each other in well-known fashion; in addition, as described in detail below, each telecommunications terminal communicates with server 102.

Figure 2:
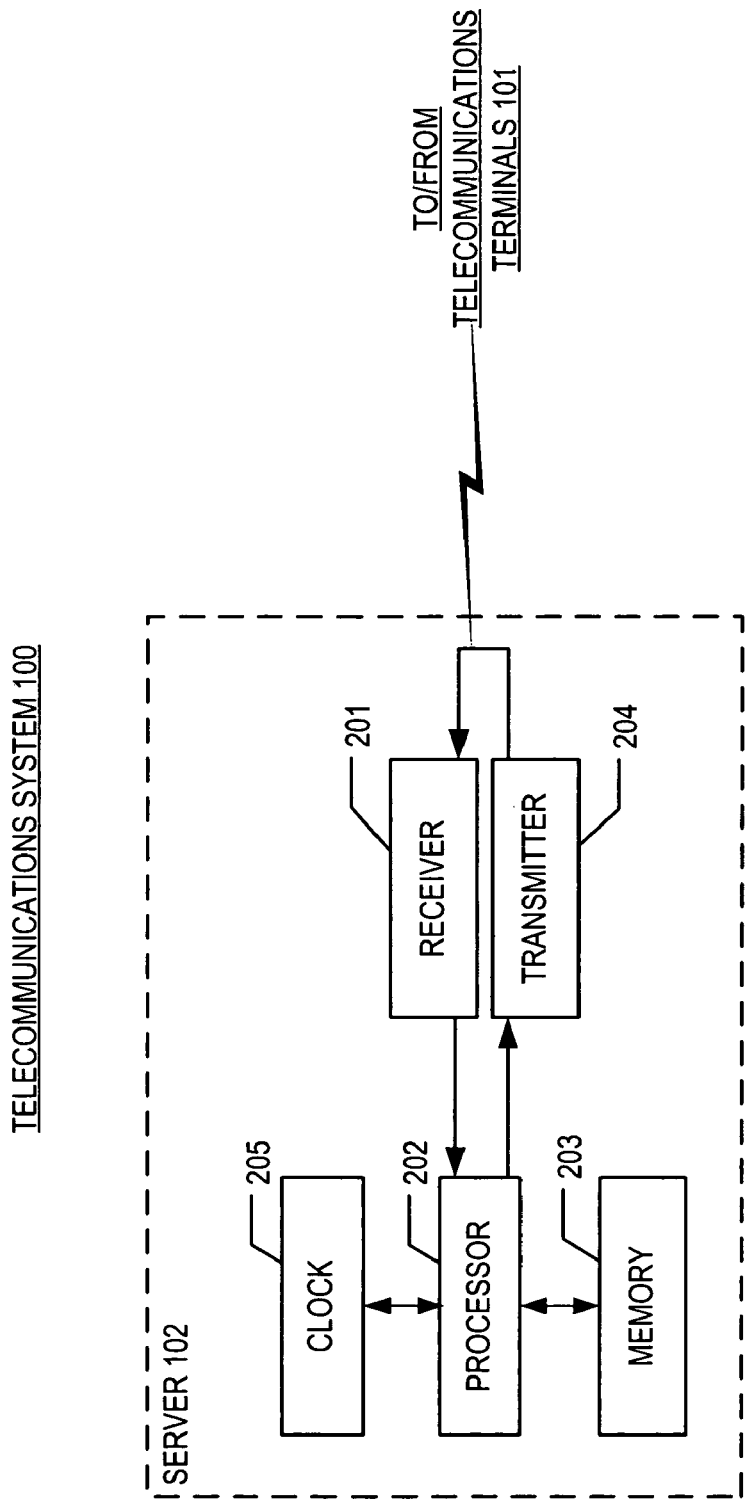
FIG. 2 depicts a block diagram of the salient components of server 102, as shown in FIG. 1, in accordance with the illustrative embodiment of the present invention.

FIG. 2 depicts a block diagram of the salient components of server 102 in accordance with the illustrative embodiment of the present invention. As shown in FIG. 2, server 102 comprises receiver 201, processor 202, memory 203, transmitter 204, and clock 205, interconnected as shown.

Receiver 201 receives signals from telecommunications terminals 101 and forwards the information encoded in these signals to processor 202, in well-known fashion. As described in detail below and with respect to FIGS. 3 and 4, the information received by receiver 201 includes the current locations of telecommunications terminals 101, requests to make a call, and user availability data. In some embodiments receiver 201 might receive signals wirelessly, while in some other embodiments receiver 201 might receive signals via wireline.

Processor 202 is a general-purpose processor that is capable of executing instructions stored in memory 203, of reading data from and writing data into memory 203, and of executing the tasks described below and with respect to FIG. 4. In some alternative embodiments of the present invention, processor 202 might be a special-purpose processor. In either case, it will be clear to those skilled in the art, after reading this disclosure, how to make and use processor 202.

Memory 203 stores data and executable instructions, as is well-known in the art, and might be any combination of random-access memory (RAM), flash memory, disk drive, etc. The manner in which information is stored and organized in memory 203 is described in detail below and with respect to FIG. 3.

Transmitter 204 receives information from processor 202 and transmits signals that encode this information to telecommunications terminals 101, in well-known fashion. In some embodiments transmitter 204 might transmit signals wirelessly to telecommunications terminals 101, while in some other embodiments transmitter 204 might transmit signals to telecommunications terminals 101 via a wireline link or network.

Clock 405 transmits the current date and time to processor 202 in well-known fashion.

Figure 3:
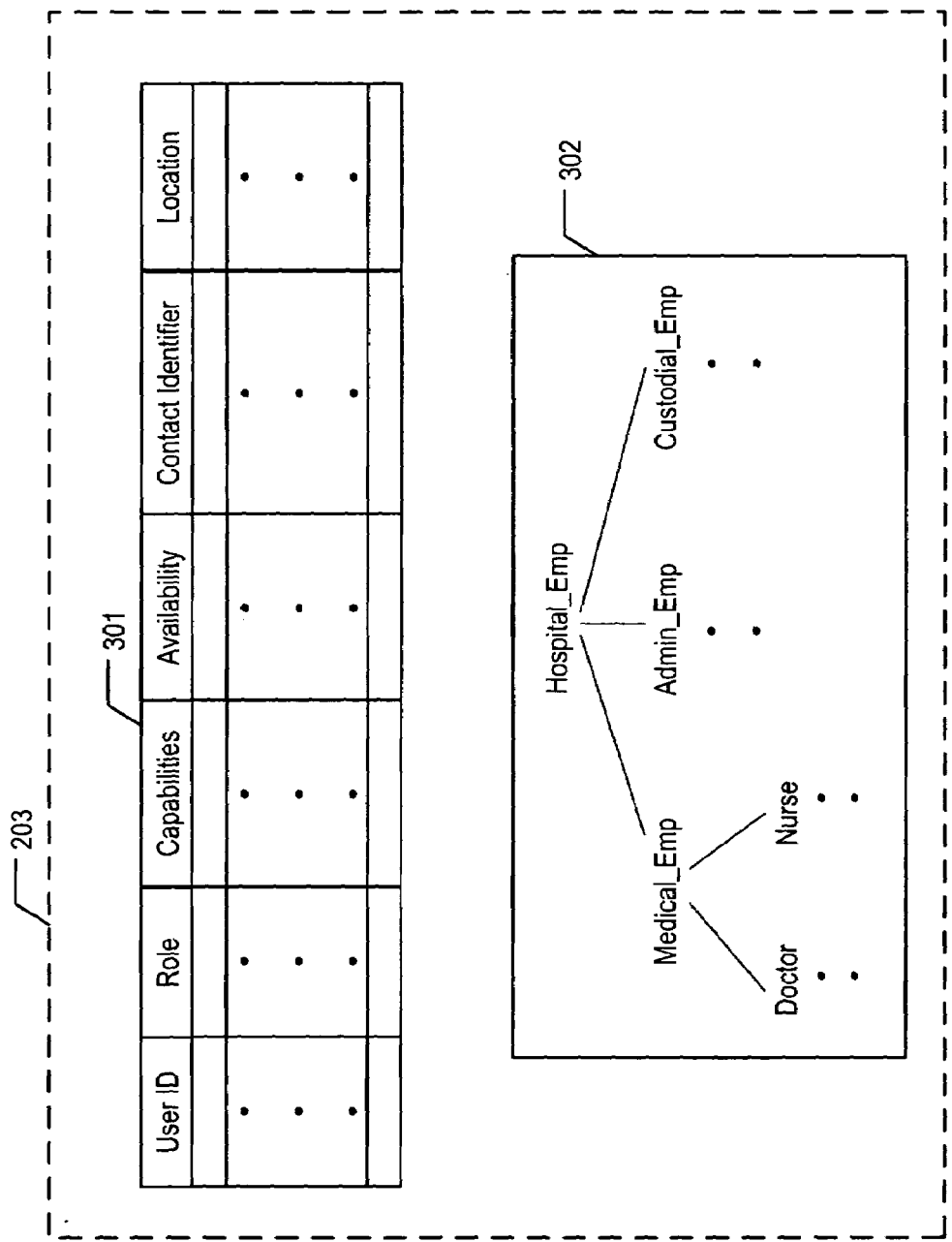
FIG. 3 depicts how information is stored and organized in memory 203, as shown in FIG. 2, in accordance with the illustrative embodiment of the present invention.

FIG. 3 depicts how information is stored and organized in memory 203 in accordance with the illustrative embodiment of the present invention. As shown in FIG. 3, memory 203 comprises user information table 301 and role hierarchy 302.

User information table 301 stores the following for each user: an identifier, a role, a list of capabilities, an availability datum, a contact identifier, and a current location.

The current location of a user, based on the user's telecommunications terminal, is received by receiver 201 and forwarded to processor 202. As will be appreciated by those skilled in the art, the location of receiver 201 might be obtained in a variety of ways. In some embodiments, the telecommunications terminal might have a Global Positioning System (GPS) receiver and periodically transmit its location to receiver 201. In some other embodiments, server 102 might periodically query a GPS-enabled telecommunications terminal for its location. In still some other embodiments, server 102 might have a location system that receives signal measurements from telecommunications terminals and/or external sensors and computes the location of telecommunications terminals based on these signal measurements.

Processor 202 stores the location in table 301; in some embodiments the location might be stored as latitude and longitude, while in some other embodiments the location might be stored as Cartesian coordinates, or as a combination of an area and Cartesian coordinates (e.g., x=10.0/y=30.0 on the third floor of Building A, etc.).

In some embodiments the list of capabilities might be stored as a linked list, while in some other embodiments the list of capabilities might be represented via a bit vector over all possible capabilities, as is well-known to those skilled in the art.

The availability datum can take a variety of forms. In some embodiments, the availability datum might be a simple flag that indicates at any point in time whether the user is currently available to receive a call. In some other embodiments, the availability datum might comprise a schedule that indicates when the user is available to receive a call (e.g., an on-call schedule, etc.). In still some other embodiments, the availability datum might comprise one or more rules that specify whether the user is available to receive a call. These rules might be based on any combination of: the user's location, calendrical time, the identity of the caller, the role of the caller, a schedule associated with the user, etc. In some embodiments it might be advantageous to arrange the rules in a hierarchy, thereby capturing the relative precedence of rules, and facilitating conflict resolution (i.e., deciding which of a plurality of conflicting rules to "fire", as is well-known in the art.)

As will be appreciated by those skilled in the art, in some embodiments the availability data might be stored manually in table 301 by a system administrator. In some other embodiments, a user might define his or her availability datum via input means of telecommunications terminal 101, whereupon the datum is automatically transmitted to server 102 and stored in table 301.

Role hierarchy 302 is a classification tree wherein the children of a role are disjoint subsets of that role. FIG. 3 depicts an exemplary role hierarchy 302 for employees in a hospital. As will be appreciated by those skilled in the art, in some other embodiments role hierarchy 302 might be structured in an alternative fashion.

Figure 4:
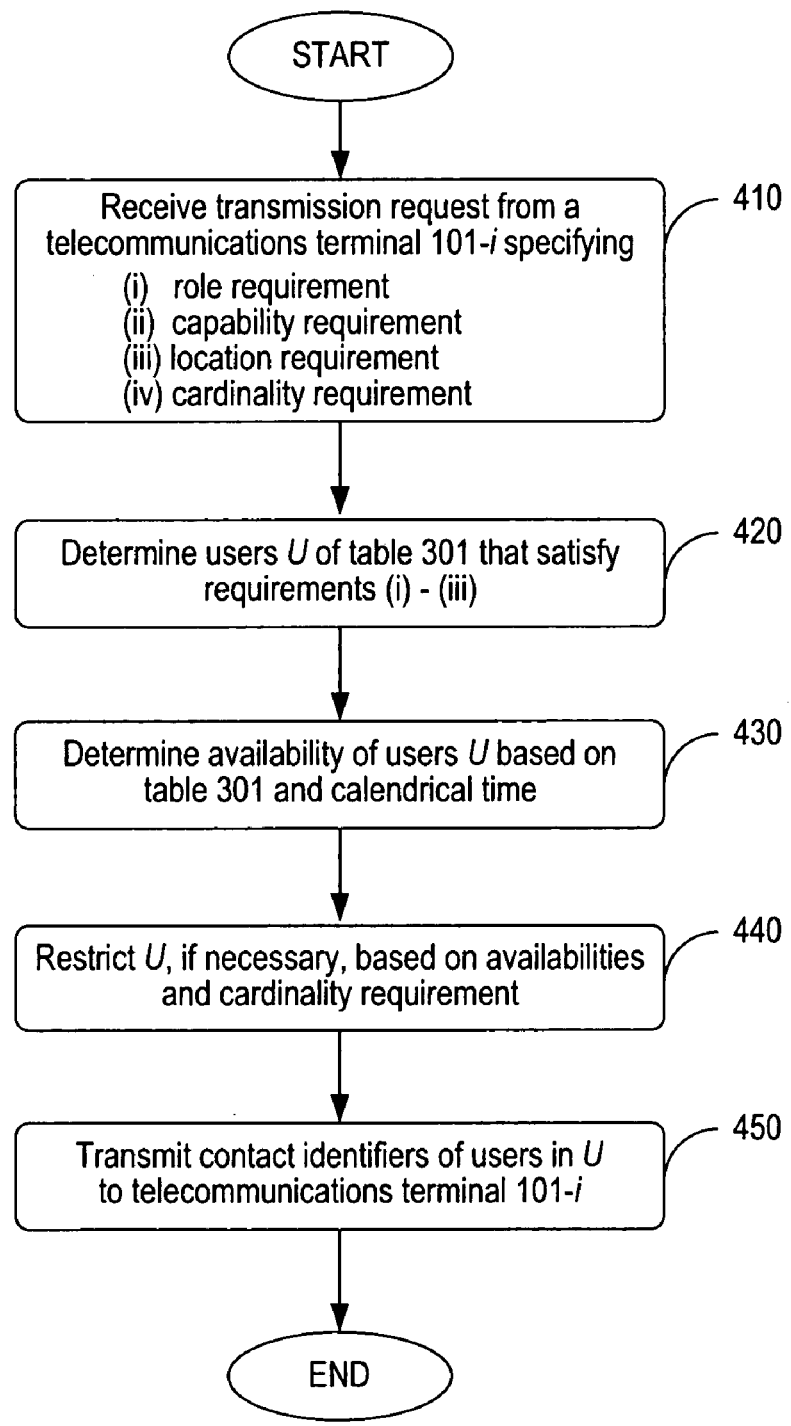
FIG. 4 depicts a flowchart for receiving a transmission request and determining to which users to transmit, in accordance with the illustrative embodiment of the present invention.

FIG. 4 depicts flowchart 400 for receiving a transmission request and determining to which users to transmit, in accordance with the illustrative embodiment of the present invention. In the illustrative embodiment, flowchart 400 is performed by server 102; however, it will be clear to those skilled in the art how to make and use alternative embodiments in which another entity (e.g., the telecommunications terminal 110-*i* placing a call, etc.) performs some or all of the tasks of flowchart 400.

At task 410, receiver 201 of server 102 receives, in well-known fashion, a transmission request that specifies one or more of the following: (i) a role requirement, (ii) a capability requirement, (iii) a location requirement, and (iv) a cardinality descriptor.

At task 420, processor 202 of server 102 determines the set of users U in table 301 that satisfy requirements (i), (ii), and (iii) of the transmission request. As will be appreciated by those skilled in the art, the manner in which task 420 is performed depends in part on how table 301 is stored in memory 203. For example, if table 301 is stored in a relational database, then task 420 can be performed via an efficient relational query, while if table 301 is stored as an unorganized "flat file," task 420 might entail traversing the table in a row-by-row fashion.

At task 430, processor 202 of server 102 determines the availability of each user in U based on the availability field of table 301, and, if necessary, the calendrical time as received from clock 205.

At task 440, processor 202 restricts set U, if necessary, in accordance with the availabilities determined at task 430, and the cardinality descriptor of the transmission request. For example, if U has four users, and one of those users is determined to be unavailable, and the cardinality descriptor of the transmission request is "less than or equal to 2," then the unavailable user and one additional user are eliminated from U. In some embodiments, the selection of available user(s) to be eliminated might be random, while in some other embodiments, there might be one or more rules based on some combination of location, role, capability, or other user attribute(s) stored in memory 203 not shown in FIG. 3 (e.g., rank, years of service, age, etc.).

At task 450, transmitter 204 of server 102 transmits the contact identifiers of the users of U to telecommunications terminal 101-*i*, in well-known fashion.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An apparatus comprising:
a memory for associating each of a plurality of users with one or more roles and a current location; and
a processor for:
(i) receiving a transmission request that specifies a role requirement, a cardinality descriptor, and a location requirement, and
(ii) determining which of said users to transmit to based on said role requirement, said cardinality descriptor, said location requirement, and the contents of said memory.

2. The apparatus of claim 1 wherein said location requirement is selected from the group consisting of: within an area, outside an area, within a distance of an area, outside a distance from an area, closest to an area, and furthest from an area.

3. The apparatus of claim 1 wherein said memory is also for storing a class hierarchy for said roles, and wherein said role requirement comprises a relationship with respect to said class hierarchy.

4. The apparatus of claim 1 wherein said memory is also for associating each of said plurality of users with one or more capabilities, and wherein said transmission request also specifies a capability requirement, and wherein the determination of which of said users to transmit to is also based on said capability requirement.

5. The apparatus of claim 1 wherein said memory is also for associating each of said plurality of users with an availability datum, and wherein the determination of which of said users to transmit to is also based on said availability datum.

6. The apparatus of claim 5 wherein said availability datum is selected from the group consisting of: a schedule, a temporal flag, a set of one or more rules, and a hierarchy of one or more rules.

7. The apparatus of claim 1 wherein said memory is also for associating each of said plurality of users with a contact identifier, and wherein said processor is also for: (iii) determining one or more contact identifiers to transmit to based on the contents of said memory.

8. The apparatus of claim 1 wherein the determination of which of said users to transmit to is also based on calendrical time.

9. An apparatus comprising:
a memory for associating each of a plurality of users with one or more capabilities and a current location; and
a processor for:
(i) receiving a transmission request that specifies a capability requirement, a cardinality descriptor, and a location requirement, and
(ii) determining which of said users to transmit to based on said capability requirement, said cardinality descriptor, said location requirement, and the contents of said memory.

10. The apparatus of claim 9 wherein said location requirement is selected from the group consisting of: within an area, outside an area, within a distance of an area, outside a distance from an area, closest to an area, and furthest from an area.

11. The apparatus of claim 9 wherein said memory is also for associating each of said plurality of users with an availability datum, and wherein the determination of which of said users to transmit to is also based on said availability datum.

12. The apparatus of claim 11 wherein said availability datum is selected from the group consisting of: a schedule, a temporal flag, a set of one or more rules, and a hierarchy of one or more rules.

13. A method comprising:
receiving a transmission request that specifies a capability requirement, a cardinality descriptor, and a location requirement; and
determining which of a plurality of users to transmit to based on
said capability requirement, said cardinality descriptor.
said location requirement,
the current locations of said users, and
capabilities associated with said users.

14. The method of claim 13 wherein said location requirement specifies being closest to an area.

15. The method of claim 13 wherein said location requirement specifies being furthest from an area.

16. The method of claim 13 wherein said location requirement specifies being outside an area.

17. The method of claim 13 wherein the determination of which of said plurality of users to transmit to is also based on availability information for one or more of said plurality of users.

18. The method of claim 13 wherein the determination of which of said plurality of users to transmit to is also based on calendrical time.

* * * * *